Patented July 10, 1934

1,965,635

UNITED STATES PATENT OFFICE 1,965,635

PRODUCTION OF POLYAZO DERIVATIVES OF 8-HYDROXY-1-NAPHTHYLAMINE

Lawrence H. Flett, Hamburg, N. Y., assignor to National Aniline & Chemical Company, Inc., New York, N. Y., a corporation of New York No Drawing. Application June 19, 1931,
Serial No. 545,488

23 Claims. (Cl. 260—69)

This invention relates to the manufacture and production of azo dyestuffs, and more particularly, to improvements in the manufacture of polyazo derivatives of 8-hydroxy-1-naphthylamine. The invention is specifically concerned with improvements in the manufacture of dyestuffs by the coupling of a diazotized arylamino compound with a 2-azo-8-hydroxy-1-naphthylamino compound.

A number of dyestuffs are known to the art which are polyazo derivatives of 8-hydroxy-1-naphthylamine and its derivatives and especially its sulfonic acid derivatives. In the manufacture of such dyestuffs, in accordance with one method generally employed in practice, an arylamino compound is diazotized, the resulting diazo compound is coupled in acid solution with an 8-hydroxy-1-naphthylamino compound to form an intermediate azo compound, and the resulting intermediate azo compound is coupled in alkaline solution with a diazotized arylamino compound. As heretofore carried out, the diazotized arylamino compound employed for coupling with the intermediate azo compound is produced by diazotizing the arylamino compound in a separate reaction mixture from that employed for the production of the intermediate azo compound, then mixing the resulting diazotized arylamino compound with the intermediate azo compound, and rendering the resulting mixture alkaline, whereby coupling takes place to form a polyazo compound.

An object of the invention is to selectively diazotize one of a plurality of aromatic primary amino compounds.

Another object of the present invention is to provide improvements in the manufacture of polyazo dyestuffs by the coupling of a 2-azo-8-hydroxy-1-naphthylamino compound with a diazotized arylamino compound whereby economies in the manufacture of the products are secured. Other objects of the invention are to increase, with respect to quality and yield, the uniformity between successive batches of the product resulting from the coupling of a diazotized arylamino compound with a 2-azo-8-hydroxy-1-naphthylamino compound, and particularly of dyestuffs resulting from the coupling of diazotized arylamino compounds of the benzene series with azo derivatives of H-acid (1.8-aminonaphthol-3.6 disulfonic acid) resulting from the coupling of H-acid with diazotized arylamino compounds in an acid medium.

Other objects of the invention will in part be obvious and will in part appear hereinafter.

It has been found, according to the present invention, in the diazotization of an arylamino compound, that the diazotization can be carried out in the presence of another arylamino compound if the latter is protected from active diazotization, and that one arylamino compound can be selectively diazotized without substantial diazotization of the protected arylamino compound. The arylamino compound which it is desired not substantially to diazotize, may be protected from diazotization by having present in its molecule constituents which repress diazotization thereof, for example by rendering the compound difficult to diazotize, or by rendering the compound difficultly soluble in the diazotization mixture, or by a combination of these two methods.

It has also been found, according to the present invention, in the production of a polyazo dyestuff by coupling a diazotized arylamino compound with a 2-arylazo-8-hydroxy-1-naphthylamino compound, obtainable by coupling a diazotized arylamino compound in acid solution with a 1.8-aminonaphthol compound free from a substituent in the 2-position, that it is not necessary to prepare the diazotized arylamino compound in a separate reaction mixture, but that the arylamino compound can be selectively diazotized in a reaction mixture containing the 2-arylazo-8-hydroxy-1-naphthylamino compound and then can be coupled with the said azo-hydroxy-naphthylamino compound in the same reaction mixture.

It has furthermore been found, according to the present invention, in the manufacture of a polyazo dyestuff from an 8-hydroxy-1-naphthylamino compound by a process which includes the coupling of a diazo compound with an 8-hydroxy-1-naphthylamino compound in an acid medium, to form a 2-azo-8-hydroxy-1-naphthylamino compound, the diazotization of an arylamino compound, and the coupling of the resulting diazo compound with the 2-azo-8-hydroxy-1-naphthylamino compound in an alkaline medium, that the arylamino compound can be selectively diazotized in the reaction mixture resulting from the acid coupling, and the coupling of the resulting diazotized arylamino compound with the azo-hydroxy-naphthylamino compound can be effected by rendering the resulting diazotization reaction mixture alkaline.

The invention accordingly comprises the steps and the relation of each with others thereof which will be exemplified in the process hereinafter disclosed. The scope of the invention will be indicated in the claims.

In the practice of the present invention a diazotizable arylamino compound may be diazotized in a reaction mixture containing a 2-azo-8-hydroxy-1-naphthylamino compound, and the mixture thus obtained of the resulting diazotized arylamino compound and the azo-hydroxy-naphthylamino compound then may be treated in any suitable manner for the production of desired products.

The invention is not limited to the production of any particular products and can be generally employed for the diazotization of diazotizable arylamino compounds in a reaction mixture containing a 2-azo-8-hydroxy-1-naphthylamino compound, and particularly one having the following nucleus in its composition:

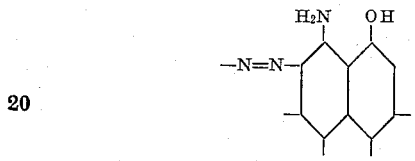

It is preferably employed in the production of polyazo derivatives of 8-hydroxy-1-naphthylamine by making alkaline the reaction mixture resulting from the diazotization of the arylamino compound in the presence of the azo-hydroxy-naphthylamino compound.

The invention is of particular advantage in the manufacture of polyazo dyestuffs and intermediate products by the coupling of an aryl diazo compound in an alkaline medium with a 2-arylazo-8-hydroxy-1-naphthylamino sulfonic acid compound having the following nucleus in its composition:

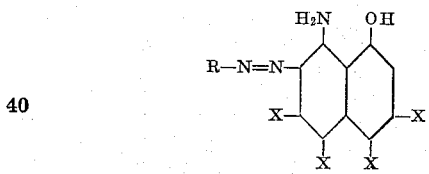

in which X is hydrogen or a sulfo group, at least one X being a sulfo group, and R is a substituted or unsubstituted aryl radical, more particularly a substituted radical of the benzene or diphenyl series; and it is especially directed to the manufacture of polyazo dyestuffs and intermediate products from a 2-arylazo-8-hydroxy-1-naphthylamino sulfonic acid compound having the following general formula:

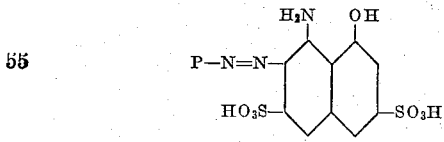

in which P is a substituted or unsubstituted aryl radical, more particularly a substituted or unsubstituted monoaryl or diaryl radical, and especially a monoaryl radical of the benzene series having one or more substituents other than a primary amino or diazo group, or a diaryl radical of the benzene series having one or more substituents other than a primary amino group.

Various diazotizable arylamino compounds may be employed in accordance with the invention, and particularly, substituted and unsubstituted primary arylamines of the benzene series; as for example, aniline, toluidine, xylidine, o-chloraniline, p-chloraniline, dichloraniline, o-nitraniline, p-nitraniline, dinitro-aniline, nitro-chloraniline, sulfanilic acid, anthranilic acid, p-nitraniline o-sulfonic acid, 2-hydroxy-3.5-dinitro-aniline, mono-acyl arylene diamines (for example, mono-acetyl-p-phenylene diamine, mono-oxalyl-m-tolylene diamine), etc.

The diazotization may be performed in any suitable manner; as for example, by adding a nitrite, such as an alkali metal nitrite, to a mixture of the azo-hydroxy-naphthylamino compound, the diazotizable arylamino compound, and an acid while maintaining the mixture at a suitable temperature. The acid is preferably a mineral acid, such as, hydrochloric or sulfuric acid. The temperature will depend upon the diazotizable amine treated, although, in general, low temperatures (those below 10° C.) are preferred.

The 2-azo-8-hydroxy-1-naphthylamino compound may be prepared in any suitable manner, either as a part of the process of the invention or independently thereof. It is preferably prepared as a part of the process by coupling a suitable diazo compound with a suitable 8-hydroxy-1-naphthylamine compound in acid solution. Moreover, the 2-azo-8-hydroxy-1-naphthylamino compound, when prepared as a part of the process, need not be separated from the acid coupling reaction medium but can be treated while still in suspension therein.

In preparing the 2-azo-8-hydroxy-1-naphthylamino compound any suitable diazo compound may be coupled in acid with the 8-hydroxy-1-naphthylamino compound; as for example, the diazo compounds of aniline, o-nitraniline, p-nitraniline-o-sulfonic acid, 2.5-dichloraniline, 2-hydroxy-3.5-dinitro-aniline, sulfanilic acid, anthranilic acid, acyl phenylene diamines (such as mono-acetyl-phenylene diamine, mono-oxalyl-tolylene diamine, etc.); and the tetrazo compounds of benzidine, its homologues and derivatives (such as, tolidine, dianisidine, their sulfonic acids, etc.). Any suitable 8-hydroxy-1-naphthylamino compound may be employed, as for example, 8-hydroxy-1-naphthylamine and its derivatives which have unsubstituted 2- and 7-positions, more particularly the mono- and disulfonic acid derivatives, and preferably H-acid (8 - hydroxy - 1 - naphthylamino - 3.6 - disulfonic acid).

In carrying out the invention in accordance with a preferred method of procedure, the diazo compound may be coupled in an acid medium, preferably an aqueous solution of a mineral acid (such as sulfuric or hydrochloric acid), with the 8 - hydroxy - 1 - naphthylamino compound free from substituents in the 2- and 7-positions, thereby forming a 2-azo-8-hydroxy-1-naphthylamino compound; the diazotizable arylamino compound may be mixed with the resulting reaction mixture and may be diazotized therein, preferably by the addition of an alkali-metal nitrite (and additional mineral acid, if necessary); and the resulting diazo compound may be coupled with the 2 - azo - 8 - hydroxy - 1-naphthylamino compound present in the reaction mixture, as by rendering the reaction mixture alkaline. The resulting dyestuff or intermediate product then may be recovered in any suitable manner.

The invention will be further explained in connection with the following specific examples which illustrate a manner of carrying it into practice. The invention is not limited thereto, however, and can be varied within wide limits without departing from the scope thereof. The parts are by weight.

*Example 1.*—49 parts of the mono-sodium salt of para-nitrobenzene-azo-H-acid is mixed with 400 parts of water, and 26 parts of 20° Bé. hydrochloric acid, and to the resulting mixture there is added 9.7 parts of aniline. The para-nitrobenzene-azo-H-acid is prepared in the usual manner by coupling equi-molecular amounts of diazotized p-nitraniline with H-acid in the presence of a mineral acid and is the mono-sodium salt of a dyestuff which in the free state has the following formula:

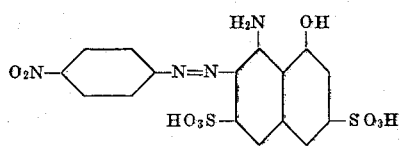

The mixture is iced to a temperature of about 0° to 10° C. and to it there is added sufficient sodium nitrite to effect the diazotization of the aniline, about 7.3 parts of sodium nitrite being required. When the diazotization is complete, the diazo solution is added to an iced solution or slurry of sodium carbonate, the amount of sodium carbonate being sufficient to maintain the reaction mixture in a strongly alkaline condition. (About 33 parts of soda ash is required.) Coupling takes place, and when completed, the precipitated disazo dye is filtered off. It is the sodium salt of a dyestuff which in the free state has the following formula:

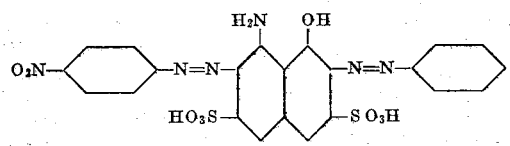

Referring to this example, in place of p-nitrobenzene-azo-H-acid, other analogous azo dyestuffs may be employed; for example those prepared by coupling H-acid in mineral acid solution with diazotized o-nitraniline, p-nitraniline-o-sulfonic acid, 2.5-dichloroaniline, 2-hydroxy-3.5-dinitro-aniline, sulfanilic acid, etc. And in place of aniline, substitution products of aniline may be used; as for example, those above mentioned.

*Example 2*.—18.4 pounds of benzidine, in the form of a 10 to 15 per cent slurry of benzidine sulfate, is tetrazotized at a temperature of about 0° to 5° C. by the use of 18.4 parts of 50° Bé. sulfuric acid and about 14.5 parts of sodium nitrite, care being taken to avoid the presence of more than a very slight excess of nitrous acid in the final tetrazotized solution. To the tetrazotized benzidine solution thus obtained, there is slowly added, with stirring, 34.1 parts of the mono-sodium salt of H-acid (1.8.3.6-aminonaphthol-disulfonic acid), the reaction-mixture being maintained at a temperature of about 5° to 14° C. When the coupling is complete, the diazo-monazo dyestuff thus produced is obtained as a precipitate, and it is probably a sodium salt of an acid having the following formula:

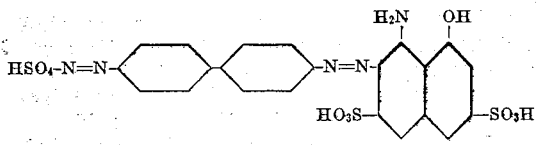

To the reaction mixture, which has an acid reaction and which contains the precipitated diazo-monazo dyestuff, there is added 9.3 parts of aniline and 7.9 parts of 50° Bé. sulfuric acid. The reaction mixture is cooled to 0° to 5° C. by the addition of ice, and 7 parts of sodium nitrite is added thereto. The aniline is thereby diazotized while the diazo-monazo dyestuff remains substantially unattacked by the nitrous acid. 40 parts of common salt are added and dissolved in the reaction mixture, and then sufficient sodium carbonate (about 23 to 25 parts) is added to make and maintain the solution alkaline. The mixture is stirred until the coupling of the diazobenzene with the diazo-monazo dyestuff is complete. The diazo-disazo dyestuff thus produced is obtained in the form of a precipitate of the sodium salt of an acid having the following formula:

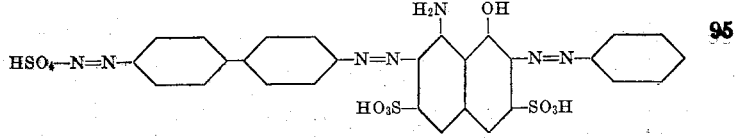

It may be further treated in any suitable or well known manner, for example as an intermediate for the preparation of other dyestuffs. Thus, it may be coupled, with or without its removal from the reaction-mixture, with any hydroxy and/or amino aromatic compound capable of combining with it (e. g., phenol, m-tolylene-diamine, 1-5- or 1.8-naphthalenediamine, N-alkyl-, N-aryl- or N-aralkyl-m-aminophenol, naphthol sulfonic acids, aminonaphthol sulfonic acids, etc.), or it may be subjected to hydrolytic decomposition in accordance with U. S. Patent 1,785,799.

Referring to the above example, it may be pointed out that benzidine base or benzidine hydrochloride may be used in the place of benzidine sulfate, and that hydrochloric acid may be used in place of sulfuric acid. Further, their homologues and nuclear substitution products, as for example, tolidine, dianisidine, their salts, sulfonic acids, etc., may be used in place of benzidine or its salts. It may be further pointed out that in the above process I have found that the presence of common salt materially aids the coupling of the diazobenzene with the diazo-monazo dyestuff, and it is preferably employed, although it may be omitted if so desired. Instead of common salt, other alkali-metal chlorides may be used. In place of aniline other aromatic primary amines may be used, e. g., o- or p-chloraniline, dichloraniline, o- or p-nitraniline, dinitroaniline, nitrochloraniline, sulfanilic acid, anthranilic acid, nitraniline sulfonic acid, monoacyl-arylenediamines, etc.

Instead of diazotizing the arylamino compound in the presence of the diazo-azo compound, coupling it with the diazo-azo compound and then coupling the resulting product with a suitable hydroxy aromatic compound, the diazoazo compound may first be coupled with the latter, and the resulting product may be employed in the process of the above example in the same manner as the diazo-azo compound.

Instead of using sodium carbonate to render the acid mixture non-acid or alkaline to produce coupling of the diazo compound with the azo-hydroxy-naphthylamino compound, other alkalinating agents may be used, as for example, sodium acetate, potassium carbonate, sodium hydroxide, potassium hydroxide, disodium phosphate, trisodium phosphate, sodium bicarbonate, etc.

As a result of the process of the invention, the products are obtained with greater uniformity in quality and yield between successive batches, and the cost is reduced, as less material, apparatus, and labor are required than in the prior known processes.

It is to be understood that the invention is not limited to the details of the process of the above examples, such as proportions of ingredients, conditions of reaction, etc., and that variations may be made therein similarly to the well known practice in the art for the production of polyazo derivatives of 8-hydroxy-1-naphthylamino compounds in accordance with known processes without departing from the scope of the invention. Accordingly, all matter contained in the above description is to be interpreted as illustrative and not in a limiting sense, except as limited by the claims.

I claim:

1. In the production of an azo dyestuff by a process which comprises diazotizing a diazotizable arylamino compound and coupling it in a non-acid medium with another aromatic primary amino compound which does not couple with said diazo compound in an acid medium, the improvement which comprises carrying out the diazotization of the diazotizable arylamino compound in an acid medium and in the presence of the other primary amino compound, and then rendering the resulting mixture non-acid, whereby coupling of the diazo compound with the other amino compound is produced.

2. In the production of an azo dyestuff by a process which comprises diazotizing a diazotizable arylamino compound and coupling it in a non-acid medium with another aromatic primary amino compound which is insoluble in the diazotization reaction mixture and which does not couple with the diazo compound in an acid medium, the improvement which comprises carrying out the diazotization of the diazotizable arylamino compound in an acid reaction mixture containing the other aromatic primary amino compound suspended therein and then rendering the resulting mixture non-acid, whereby coupling of the diazo compound with the other amino compound is produced.

3. In the production of an azo dyestuff by a process which comprises diazotizing a diazotizable arylamino compound and coupling it in a non-acid medium with another aromatic primary amino compound which is insoluble in the diazotization reaction mixture and which does not couple with the diazo compound in the acid medium, but is soluble and couples in alkaline solutions, the improvement which comprises carrying out the diazotization of the diazotizable arylamino compound in an acid reaction mixture containing the other aromatic primary amino compound suspended therein, and then rendering the resulting mixture alkaline, whereby coupling of the diazo compound with the other amino compound is produced.

4. The process of making an azo dyestuff which comprises diazotizing a diazotizable arylamino compound in a reaction mixture containing a 2 - arylazo - 8 - hydroxy-1-naphthylamino compound.

5. The process of making a polyazo dyestuff which comprises diazotizing a diazotizable arylamino compound in an acid reaction mixture containing a 2-arylazo-8-hydroxyl-1-naphthylamino compound, and coupling the resulting diazo compound to produce a dyestuff.

6. The process of making a polyazo dyestuff which comprises diazotizing a diazotizable arylamino compound in an acid reaction mixture containing a 2-arylazo-8-hydroxyl-1-naphthylamino compound, and coupling the resulting diazo compound with the arylazo-hydroxy-naphthylamino compound.

7. The process of making a polyazo dyestuff which comprises diazotizing a diazotizable arylamino compound in an acid reaction mixture containing a 2-arylazo-8-hydroxyl-1-naphthylamino compound, and making the reaction mixture alkaline, whereby coupling of the diazo compound with the arylazo-hydroxy-naphthylamino compound is produced.

8. The process of making an azo dyestuff which comprises diazotizing a diazotizable arylamino compound in an acid reaction mixture including a 2-arylazo-8-hydroxy-1-naphthylamino compound which is unsubstituted in the 7-position of the naphthalene nucleus.

9. The process of making a polyazo dyestuff which comprises diazotizing a diazotizable arylamino compound in an acid reaction mixture including a 2-arylazo-8-hydroxy-1-naphthylamino compound which contains in its composition the nucleus:

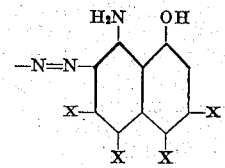

in which X is a hydrogen atom or a sulfo group, and coupling the resulting diazo compound with the arylazo-hydroxy-naphthylamino compound.

10. The process of making an azo dyestuff which comprises coupling in an acid medium an aromatic diazo compound with an 8-hydroxy-1-naphthylamino compound which is unsubstituted in the 2- and 7-positions of the naphthalene nucleus, whereby a 2 - arylazo - 8-hydroxy-1-naphthylamino compound is produced, mixing a diazotizable arylamino compound with the resulting reaction mixture, and diazotizing the arylamino compound in the resulting mixture.

11. The process of making a polyazo dyestuff which comprises coupling an aromatic diazo compound with an 8-hydroxy-1-naphthylamino sulfonic acid having the general formula:

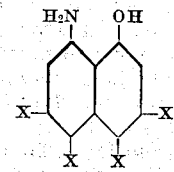

in which X is a hydrogen atom or a sulfo group, at least one X being a sulfo group, whereby a 2-arylazo-8-hydroxy-1-naphthylamino sulfonic acid is produced, mixing a diazotizable arylamino compound with the reaction mixture, diazotizing the arylamino compound in the resulting mixture, and coupling the resulting diazo compound with the arylazo - hydroxy - naphthylamino sulfonic acid.

12. The process of making an azo dyestuff which comprises diazotizing a diazotizable arylamino compound of the benzene series in an acid reaction mixture containing a 2-arylazo-8-hydroxy-1-naphthylamino-3.6 disulfonic acid.

13. The process of making a polyazo dyestuff which comprises diazotizing a diazotizable arylamino compound of the benzene series in an acid reaction mixture containing a 2-arylazo-8-hydroxy-1-naphthylamino-3.6 disulfonic acid, and then making the reaction mixture alkaline, thereby coupling the resulting diazo compound with the arylazo-disulfonic acid.

14. The process of making an azo dyestuff which comprises coupling an aromatic diazo compound in an acid medium with H-acid, whereby a 2-arylazo-8-hydroxy-1-naphthylamino-3.6-disulfonic acid is produced, mixing a diazotizable arylamino compound with the resulting reaction mixture, and diazotizing the arylamino compound in the resulting mixture.

15. The process of making a polyazo dyestuff which comprises coupling an aromatic diazo compound with H-acid in an acid medium, thereby producing an arylazo-H-acid derivative, mixing a diazotizable arylamino compound with the reaction mixture, diazotizing the arylamino compound in the resulting mixture, and then making the resulting mixture alkaline, thereby coupling the resulting diazo compound with the arylazo-H acid derivative.

16. The process of making a polyazo dyestuff which comprises coupling a diazo compound of the benzene series with H-acid in an acid medium, whereby a 2-arylazo-8-hydroxy-1-naphthylamino-3.6-disulfonic acid is produced, mixing a diazotizable arylamino compound of the benzene series with the resulting reaction mixture, diazotizing the arylamino compound in the resulting mixture, and then making the reaction mixture permanently alkaline, thereby coupling the resulting diazo compound with the arylazo-disulfonic acid.

17. The process of making a polyazo dyestuff which comprises coupling a tetrazo compound of the benzidine series with H-acid in an acid medium, thereby producing an arylazo-H-acid derivative, mixing a diazotizable arylamino compound of the benzene series with the reaction mixture, diazotizing the arylamino compound in the resulting mixture, and then making the resulting mixture alkaline, thereby coupling the resulting diazo compound with the arylazo-H acid derivative.

18. The process of making a polyazo dyestuff which comprises coupling p-nitro-diazobenzene with H-acid in a mineral acid solution, adding aniline to the resulting mixture, diazotizing the aniline in the mixture by an alkali metal nitrite and a mineral acid, and then mixing the resulting reaction mixture with an alkali.

19. The process of making a polyazo dyestuff which comprises tetrazotizing benzidine in a mineral acid solution, coupling the resulting tetrazo compound with H-acid in said acid solution, then adding aniline, diazotizing the aniline in the resulting acid mixture by an alkali metal nitrite and a mineral acid, and then mixing the resulting reaction mixture with an alkali.

20. The process of making a polyazo dyestuff which comprises tetrazotizing benzidine in a mineral acid solution, coupling the resulting tetrazo compound with H-acid in said acid solution, then adding aniline, diazotizing the aniline in the resulting acid mixture by an alkali metal nitrite and a mineral acid, adding sodium chloride to the reaction mixture thereby produced, and then rendering the reaction mixture permanently alkaline with sodium carbonate.

21. In the production of a polyazo dyestuff by coupling a diazo compound with an arylazo-H-acid compound having the formula:

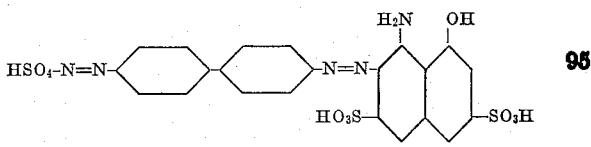

the improvement which comprises carrying out the coupling in an alkaline medium containing sodium chloride.

22. In the production of a polyazo dyestuff by coupling a diazo compound of the benzene series with an arylazo-H-acid compound having the formula:

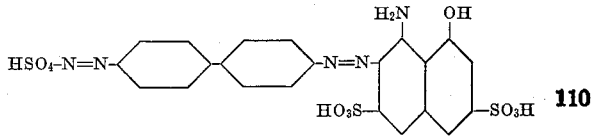

the improvement which comprises carrying out the coupling in an alkaline medium containing sodium chloride in excess of that normally present in the reaction mixture as a by-product of the process of preparing the coupling intermediates.

23. In the production of a polyazo dyestuff by coupling a diazo compound of the benzene series with an arylazo-H-acid compound having the formula:

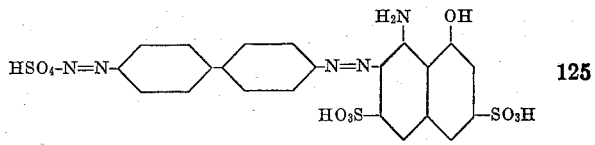

the improvement which comprises mixing sodium chloride with the diazo compound and the azo-H-acid compound and making the mixture alkaline.

LAWRENCE H. FLETT.

CERTIFICATE OF CORRECTION.

Patent No. 1,965,635.  July 10, 1934.

LAWRENCE H. FLETT.

It is hereby certified that error appears in the printed specification of the above numbered patent requiring correction as follows: Page 2, line 106, after "o-nitraniline," insert p-nitraniline,; page 3, line 106, for "1-5-" read 1.5-; page 4, lines 79 and 86, claims 6 and 7 respectively, for "hydroxyl" read hydroxy; and that the said Letters Patent should be read with these corrections therein that the same may conform to the record of the case in the Patent Office.

Signed and sealed this 2nd day of October, A. D. 1934.

(Seal)

Leslie Frazer
Acting Commissioner of Patents.